United States Patent [19]

Chikuma et al.

[11] Patent Number: 5,197,110
[45] Date of Patent: Mar. 23, 1993

[54] WAVELENGTH CONVERTING DEVICE HAVING A SURROUNDING RESIN LAYER

[75] Inventors: Kiyofumi Chikuma; Sota Okamoto, both of Iruma, Japan

[73] Assignee: Pioneer Electronic Corporation, Tokyo, Japan

[21] Appl. No.: 755,017

[22] Filed: Sep. 4, 1991

[30] Foreign Application Priority Data

Nov. 30, 1990 [JP] Japan .................................. 2-337303

[51] Int. Cl.$^5$ .......................... G02B 6/34; G02B 6/10
[52] U.S. Cl. .................................... 385/122; 359/326; 385/127
[58] Field of Search ............... 385/122, 123, 124, 126, 385/127, 128, 141; 359/326–332

[56] References Cited

U.S. PATENT DOCUMENTS

| | | | |
|---|---|---|---|
| 4,830,447 | 5/1989 | Kamiyama et al. | 359/328 X |
| 4,838,638 | 6/1989 | Kamiyama et al. | 385/122 |
| 4,981,337 | 1/1991 | Okamoto et al. | 385/122 X |
| 4,991,931 | 2/1991 | Harada et al. | 359/326 |
| 5,049,762 | 9/1991 | Katoh | 359/332 |

FOREIGN PATENT DOCUMENTS 2-219032  8/1990  Japan .................................. 385/122

*Primary Examiner*—Akm E. Ullah
*Attorney, Agent, or Firm*—Fish & Richardson

[57] ABSTRACT

A wavelength converting device is constructed by: a fiber type wavelength converting device which uses the Cerenkov radiation type phase matching and comprises a non-linear optical crystalline core and a clad; and a transparent resin portion surrounding the wavelength converting device, wherein the resin portion has a resin outgoing edge surface of a large enough size such that the entire second harmonics light is emitted from the outgoing edge surface. The above device is a light-wavelength converting device having long enough operation length and a high conversion efficiency and is a device having an excellent environmental resistance and a high coupling efficiency.

7 Claims, 2 Drawing Sheets

WAVELENGTH CONVERTING DEVICE HAVING A SURROUNDING RESIN LAYER

BACKGROUND OF THE INVENTION

1. Field of the Invention

The present invention relates to a light-wavelength converting device using a Cerenkov radiation type phase matching for converting a laser light or the like into a light of a wavelength which is the half of that of the laser light.

2. Description of the Prior Art

As a light-wavelength converting device, there has been known a device which is formed in a shape of an optical fiber comprising a core of a non-linear optical crystal and a cladding or clad surrounding the core and which uses a Cerenkov radiation type phase matching. Such a light-wavelength converting device is also known as a second harmonics generator (hereinafter, abbreviated to "SHG") of the optical fiber type. According to the Cerenkov radiation method, the second harmonics in which the phase matching of the light is accomplished can be almost automatically generated, so that the SHG is applied to the light-wavelength converting apparatus or the like.

As shown in FIG. 1, an example of the light-wavelength converting apparatus comprises: a semiconductor laser 1; a coupling lens 2 for converging lights which are radiated from the semiconductor laser and for allowing the lights to enter an incident side edge surface of the SHG; an SHG 3 in which a core is formed by a non-linear optical crystal; and an axicon 4 for shaping a wave front of the second harmonics which have been converted by the SHG 3 and radiated and for obtaining the parallel light flux from the second harmonics. As mentioned above, there is a light source module including: the fiber type wavelength converting device; the coupling optical system for waveguiding the laser light radiated from the semiconductor laser, a YAG laser, or the like to the fiber type wavelength converting device; and the optical system for converting the wavelength converted second harmonics light into the parallel light.

FIG. 2 is a conceptional diagram of the operation of the SHG mentioned above. The SHG comprises: a cylindrical core 10 and a cylindrical clad layer 20 which concentrically surrounds the core 10.

In FIG. 2, when a fundamental wave mode is index $N(\omega)$ in the direction from the left to the right in the diagram, a non-linear polarization wave which generates the second harmonics is also propagated at the same phase velocity $C/N(\omega)$ (C: light velocity). It is assumed that the non-linear polarization wave had generated the second harmonics at a point A in the diagram in the direction of a Cerenkov radiation angle $\theta$ from the waveguide direction and again has generated the second harmonics at a point B in the $\theta$ direction in a manner similar to the above after the elapse of a unit time. If the second harmonics generated at the A point are propagated, for instance, in the clad layer 20 and reach a point C after the elapse of a unit time and the Cerenkov radiation angle $\theta$ is equal to an angle at which the line segments AC and BC perpendicularly cross, the wave front of the second harmonics in which the non-linear polarization wave has been generated in a range between the points A and B is set to the line segment BC, so that the coherent second harmonics have eventually produced.

The sound harmonics generated as mentioned above are propagated as a clad mode such that the total reflection is repeated at the boundary between the clad layer 20 and the air. As shown in FIG. 3, the second harmonics are emitted like a circular cone from the outgoing edge surface of the SHG in the direction which is determined by the Cerenkov radiation angle $\theta$. The equi-phase front of the outgoing wave front of the second harmonics emitted as mentioned above has a circular cone shape using a center shaft of the fiber axis.

As the above SHG, there has been proposed a fiber type wavelength converting device of the Cerenkov radiation type which is formed by a method whereby an organic non-linear material fused into a glass capillary having an outer diameter of about 1 to mm, an inner diameter of 1 to μm, and a length of a few mm to ten and a few mm is sucked by the capillary phenomenon and, after that, it is crystallized. As a core material, an organic non-linear optical material, MNA, DAN, NPP, PNP, DMNP, MMONS, etc. can be used. In the case of using such an SHG to a light-wavelength converting apparatus such as a light source module mentioned above or the like, a simple coating is performed to an incident side edge surface 21 and an outgoing side edge surface 22 of the SHG, thereby preventing a deterioration by sublimation and moisture absorption of the organic non-linear material in the core.

In the case where thicknesses of coating films of those edge surfaces lie within a range about from hundreds Å to thousands Å, however, the sublimation and the moisture absorption of the organic non-linear material cannot be sufficiently prevented. Further, a deterioration of the incident light coupling efficiency due to the deposition of dusts onto the incident edge surface cannot be suppressed. It is necessary to increase the fiber length of the SHG in order to improve the wavelength conversion efficiency. The effective operation length of the SHG is equal to a length which is required until the second harmonics which are generated are reflected by the interface between the glass of the clad and the air and are again returned to the core. Consequently, the operation length can be increased only by setting the outer diameter of the SHG to a large value. Since it is difficult to manufacture a thick capillary serving as a clad, it is not easy to form a high efficient wavelength converting device.

SUMMARY OF THE INVENTION

The invention is made to improve the above drawbacks and it is an object of the invention to provide a light-wavelength converting device having a high coupling light-wavelength conversion efficiency.

A wavelength converting apparatus of the invention comprises: a fiber type wavelength converting device which is constructed by a cylindrical core which uses a Cerenkov radiation type phase matching and is made of a non-linear optical crystal and a cylindrical clad which surrounds the core; and a transparent resin portion which surrounds the fiber type wavelength converting device, wherein the resin portion has a resin outgoing edge surface including a circle of a radius $\gamma$ which satisfies the following equation (1) when an optical axis is used as a center, $$\gamma = \tan\theta \times (l+a) \tag{1}$$

where, in the fiber wavelength converting device, l: length in the extending direction a: length from an outgoing edge surface to the resin outgoing edge surface θ: Cerenkov radiation angle.

According to the invention, the coupling light-wavelength conversion efficiency can be raised by the peripheral resin portion surrounding the fiber type wavelength converting device. An output fluctuation of the converted second harmonics can be further stabilized.

DETAILED DESCRIPTION OF A PREFERRED EMBODIMENT

An embodiment of the invention will be described in detail hereinbelow with reference to the drawings.

Figure 1:
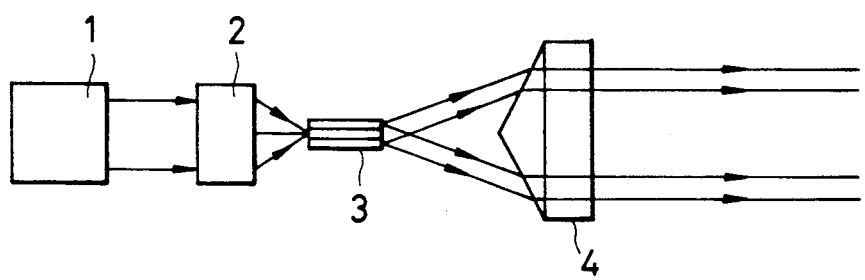
FIG. 1 is a schematic diagram of a short wavelength light source using an SHG.
Figure 2:
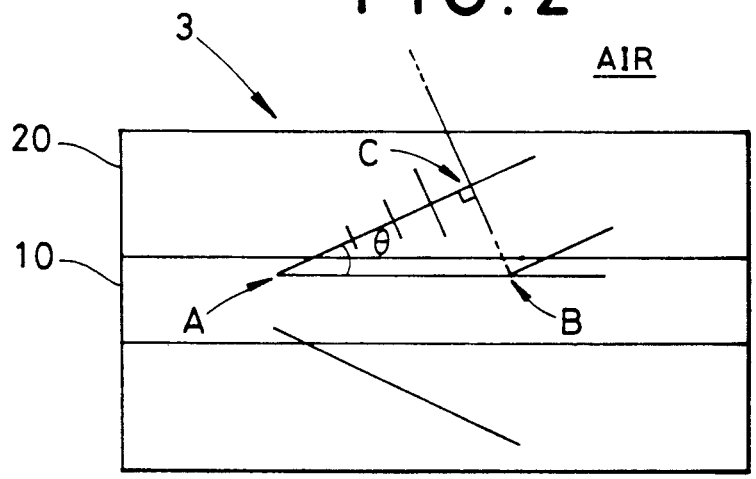
FIG. 2 and 3 are schematic cross sectional views of the SHG.
Figure 3:
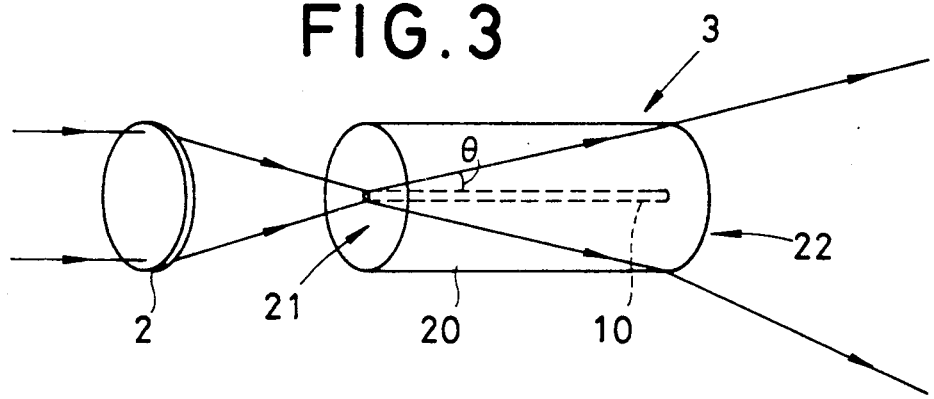
Figure 4:
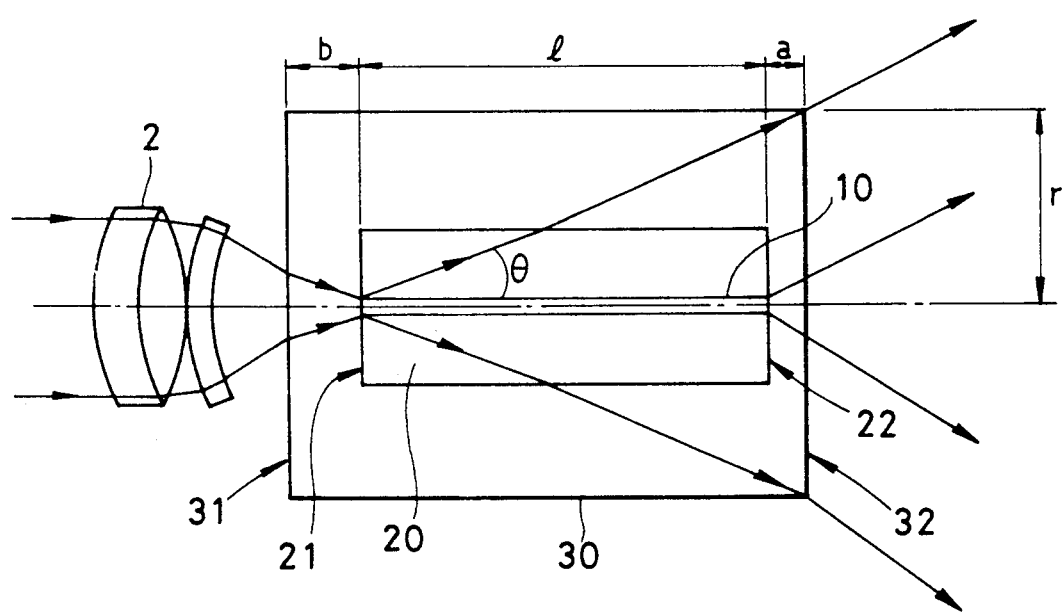
FIG. 4 is a schematic diagram of a wavelength converting device according to the invention.

FIG. 4 shows an outline of a light-wavelength converting device of the embodiment. The same parts and components as those shown in FIG. 3 are designated by the same reference numerals. The light-wavelength converting device is constructed by: an SHG comprising the cylindrical core 10 made of a non-linear optical crystal and the hollow cylindrical clad layer 20 which concentrically surrounds the core 10; and a resin portion 30 surrounding the SHG. As shown in FIG. 4, it is necessary that an outgoing edge surface 32 of the resin portion has an enough large size in a manner such that the second harmonics light which is radiated is not reflected by the bottom surface and the side surface of the resin portion but the entire second harmonics light is radiated from the outgoing edge surface.

That is, the resin portion needs to have the edge surface 32 including a circle of a radius γ which satisfies the following relation (1) when an optical axis of the SHG is used as a center $$\gamma = \tan\theta \times (l+a) \quad (1)$$

where,

γ: length in the extending direction of the internal SHG a: length from the outgoing edge surface 22 of the SHG to the resin outgoing edge surface 32

θ: Cerenkov radiation angle of the SHG.

The above light-wavelength converting device is formed in the following manner.

First, a coating is performed onto the incident side edge surface 21 and the outgoing side edge surface 22 of the fiber type wavelength converting device. After that, the SHG is buried into a transparent resin such as liquid-like polyester or acrylic resin or the like filled in a predetermined pillar-shaped die such as a cylinder or the like and the resin is hardened. The outer diameter of the hardened resin portion is not limited to the above cylindrical shape but can also have a polygonal cross sectional surface such as a quadrangle or the like. After that, the incident edge surface 31 and the outgoing edge surface 32 of the resin portion made of the hardened resin are polished and processed so as to obtain mirror surfaces, thereby forming the light-wavelength converting device.

As another manufacturing method, the SHG is set into a holder which has previously been made of a resin such as acryl or the like and, after that, the peripheral portion is fixed by the same resin. The surface of the die directly appear as edge surfaces.

By forming such a buried type wavelength converting device, the clad layer is covered by the transparent resin, so that the limitation of the operation length due to the restriction of the outer diameter of the SHG is eliminated and the light-wavelength converting device having an enough long operation length and a high conversion efficiency is derived. Since the SHG is molded by the resin, the wavelength converting device having an excellent environmental resistance can be obtained. Since the core is buried as mentioned above, further, even if dusts are deposited onto the resin incident edge surface 31 of the wavelength converting device, a coupling efficiency is hardly influenced because a beam diameter of the laser light on the edge surface 31 is equal to hundreds of μm.

In any of the above manufacturing methods, it is preferable to bury the SHG into the resin portion in a manner such that a distance b from the incident side resin edge surface 31 of the resin portion to the incident edge surface 21 or the SHG is set to a predetermined value, for example, 1.2±0.1 mm. This is because a lens whose spherical aberration which is caused in a substrate of 1.2 mm has been corrected can be used as a lens to waveguide the laser light to the SHG. Such a lens is similar to a lens for reproduction which is used in a CD player, a video disc player, or the like.

As mentioned above, according to the invention, there is obtained the light-wavelength converting device which is constructed by: the fiber type wavelength converting device which uses the Cerenkov radiation type phase matching and comprises the non-linear optical crystalline core and the clad; and the transparent resin surrounding the wavelength converting device, wherein the resin portion has the resin outgoing edge surface of an enough large size so that the entire second harmonics light is emitted from the outgoing edge surface, so that the operation length is sufficiently long and the conversion efficiency is high. Thus, the device having an excellent environmental resistance and a high coupling efficiency is obtained.

What is claimed is:

1. A wavelength converted device using Cerenkov radiation-type phase matching, comprising:

a cylindrical core made of a non-linear optical material and having a longitudinal length "l";

a cylindrical clad layer radially surrounding the cylindrical core and having the same longitudinal length "l"; and a transparent resin portion formed integrally so as to completely surround the cylindrical core and the cylindrical clad layer, said transparent resin portion comprising:

a surrounding layer radially surrounding the cylindrical clad layer and having the same longitudinal length "l", an incoming axial end surface layer having a thickness "b" and provided on one common end of the cylindrical core, the clad layer, and the surrounding layer, and an outgoing axial end surface layer having a thickness "a" and provided on the other common end of the cylindrical core, the clad layer, and the surrounding layer;

wherein the outgoing axial end surface layer has a radius "γ" which satisfies the relation:

$$\gamma = \tan\Theta \cdot (l+a)$$

where Θ is the Cerenkov radiation angle; and
wherein the surrounding layer has a thickness such that a cross-sectional radius through the core, the clad layer, and the surrounding layer is equal to the radius "γ" of the outgoing axial end surface layer, thereby causing secondary harmonics light to pass through an interface between the clad layer and the surrounding layer and exit through the outgoing axial end surface layer.

2. A device as claimed in claim 1, wherein the length "b" is approximately 1.2 mm.

3. A device as claimed in claim 1, wherein the resin portion is made of polyester or acrylic resin.

4. A device as claimed in claim 1, wherein the resin portion has a cylindrical shape.

5. A device as claimed in claim 3, wherein the resin portion has a cylindrical shape.

6. A device as claimed in claim 1, wherein the resin portion has a polygonal shape.

7. A device as claimed in claim 3, wherein the resin portion has a polygonal shape.

* * * * *